United States Patent [19]

Wium

[11] 4,216,349
[45] Aug. 5, 1980

[54] FILL CONTROL FOR SEALING CHAMBER IN DRAINABLE ENCLOSURE FOR EXPLOSION-PROOF ELECTRICAL SYSTEM

[75] Inventor: Eigil Wium, Cheshire, Conn.

[73] Assignee: General Signal Corporation, Stamford, Conn.

[21] Appl. No.: 53,614

[22] Filed: Jun. 29, 1979

[51] Int. Cl.² .............................................. H02B 3/02
[52] U.S. Cl. .................................. 174/50; 174/23 R; 174/77 R
[58] Field of Search ...................... 174/22 R, 23 R, 50, 174/68 R, 76, 77 R

[56] References Cited

U.S. PATENT DOCUMENTS

| 2,711,438 | 6/1955 | Bissell | 174/50 |
| 2,835,722 | 5/1958 | Appleton | 174/50 |

Primary Examiner—Laramie E. Askin
Attorney, Agent, or Firm—Milton E. Kleinman; George W. Killian

[57] ABSTRACT

An electrical fitting for use in a conduit run which includes a sealing chamber into which a compound is placed to prevent the passage of gasses, vapors, or flames from one end of the fitting to the other. The fitting includes a drainage port to prevent the collection of water and a filling port through which the sealing compound is placed in the sealing chamber. The drainage port and sealing chamber have coplanar upper limits whereby any excess sealing compound placed in the sealing chamber is drained off through the drainage port. An interior shield member of the body shields the upper opening of the drainage port whereby no sealing compound can enter the drainage port directly from the filling port. Thus, there can be no flow of sealing compound through the drainage port until the sealing chamber has been filled. Underfill and overfill of the sealing chamber are prevented, and no core or plug projects upward from the drainage port during filling. Depending upon the type of sealing compound used, a disposable protector with a through passage may be placed in the lower portion of the drainage port to protect the threads of the drainage port from contact with the excess sealing compound.

4 Claims, 1 Drawing Figure

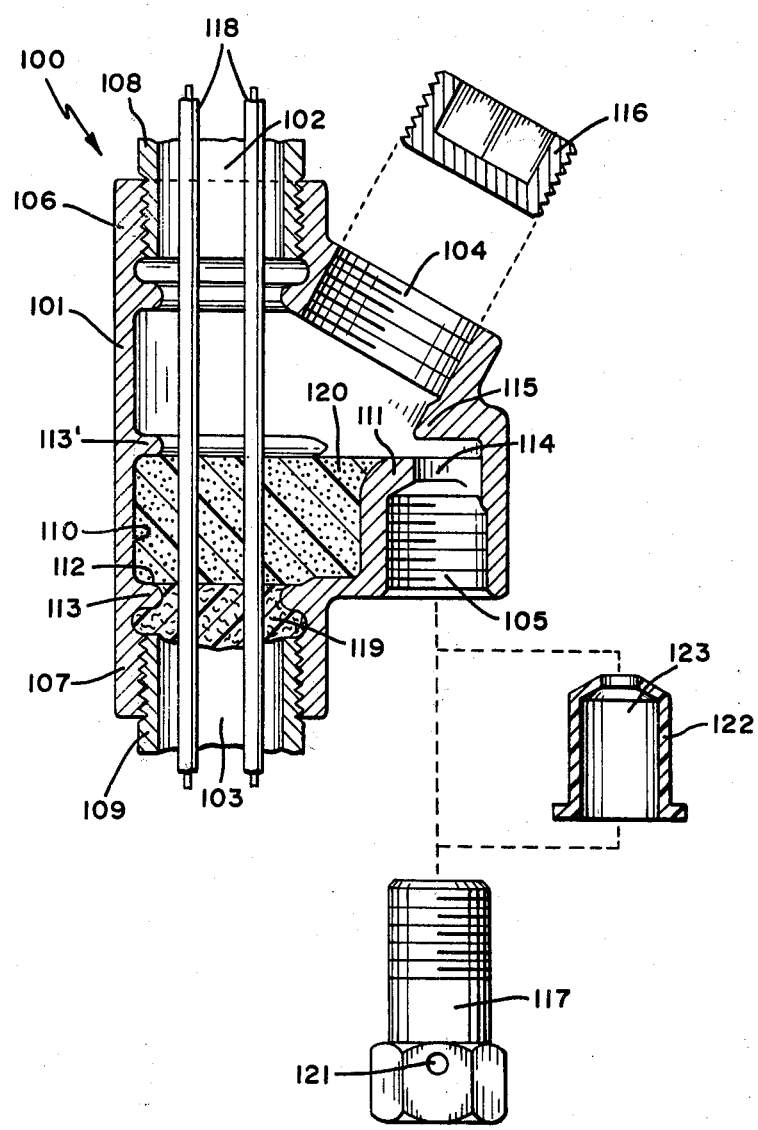

FILL CONTROL FOR SEALING CHAMBER IN DRAINABLE ENCLOSURE FOR EXPLOSION-PROOF ELECTRICAL SYSTEM

BACKGROUND OF THE INVENTION

It is well known that when an electrical circuit is broken, there is a tendency for a spark to occur. Many fires have been ignited unintentionally by an electrical spark occurring in an explosive atmosphere. That is, if the atmosphere in the vicinity of the spark should include more than a critical amount of explosive gasses or vapors, an explosion and fire may result and possibly cause extensive damage or loss of life. Accordingly, precautions are customarily taken with electrical circuits in locations where an explosive atmosphere exists, or might exist. A fire, once started, may travel through an electrical conduit, and an explosive atmosphere may enter an electrical conduit and be guided to a switch location. Accordingly, to avoid such transmission through conduits, it has become conventional, under selected circumstances, to provide barriers within the conduit. Examples of structures which provide barriers may be seen in U.S. Pat. Nos. 2,711,438 and 2,835,722, issued June 21, 1955, to C. H. Bissell, and May 20, 1958, to Arthur I. Appleton, respectively. As may be seen in these structures, a special fitting is used to join two sections of conduit, and a sealing compound is placed within a well, or chamber, in the fitting to provide a barrier.

Even in locations which are presumed to be dry it is not uncommon for water to form in the interior of the conduit. This is normally a result of a combination of the changes in atmospheric conditions, humidity, and/or temperature. As a result, outside air is drawn into the conduit system as it "breathes". If such air carries sufficient moisture, it will be condensed within the system when the temperature decreases and chills the air. The resultant water accumulation will remain within the conduit and have more added thereto in response to repeated cycles of the breathing cycle. A collection of such water can adversely affect the electrical circuit, and therefore it has been found desirable to make a provision for draining water, or other liquids, that might otherwise collect in the sealed fitting. A simple opening to effect a drain would, obviously, defeat the purpose of the seal. Suitable drains have been devised which will permit the drainage of liquid from a sealed enclosure without adversely affecting the effectiveness of the seal for preventing the transmission of fire and/or explosive atmospheres. One form of suitable seal is disclosed in U.S. Pat. No. 2,405,927, issued Aug. 13, 1946, to N. A. Tornblom. A wide variety of drains for different types of applications has been developed. The drain, per se, does not form an integral part of this invention, except to the extent that the fitting must allow for the inclusion of one of the variety of drains available. Accordingly, it is believed that the disclosure of the details of any specific drain would only unnecessarily enlarge this specification and obscure the inventive concept.

Typical fittings, of the class described, usually include four ports, two of which are normally aligned and provide means for coupling from the fitting to the conduit. Another port provides a means for connecting a suitable drain plug, and the last port provides a working access for the application of a suitable sealing compound within a well, or chamber, in the fitting. After the application of the sealing compound, a plug closes that access port. In typical prior art structures, care had to be exercised to avoid causing the sealing compound to seal off the drain port. In some structures, a drain port plug was provided and removed after the hardening of the sealing compound. In other structures, a drain port plug and/or core was provided.

In some structures such plug or core was placed or removed through the access or working port and therefore sometimes inconvenienced the artisans working on the fitting and preparing it for receipt of the filling compound. The plug or core also tended to obscure vision, making it difficult to see inside the fitting and determine if the level of the sealing compound in the chamber was at an appropriate level. As a result, it was not unusual to have fittings with either over or underfill.

SUMMARY OF THE INVENTION

The structure disclosed herein obviates the need for a drain port plug or core; and, therefore, no such device projects into the working port to obstruct vision or working space. A feature of the invention resides in the fact that the upper limit of the drain port and the desired level of the sealing compound are coplanar. Accordingly, when liquid sealing compound is poured into the fitting through the working port, excess sealing compound cannot remain within the fitting as it will overflow through the drain port. Another feature of the invention resides in the fact that the working port has no direct in-line communication with the drain port. Therefore, as sealing compound is poured into the fitting, it cannot enter the drain port directly but must flow into the sealing chamber. Accordingly, the artisan preparing the connection will pour sealing compound into the fitting through the working port until such time as an overflow comes out through the drain port. The presence of overflow emerging from the drain port is evidence that there is not an underfill; and, because of the coplanar level of the upper limit of the drain port and the sealing chamber, there can be no overfill. When desired, a plug with a through passage may be placed in the drain port from the lower side to protect the threads of the drain port from contact with the sealing compound.

It is an object of the invention to provide a new and improved fitting for explosion-proof electrical systems.

It is a more specific object of the invention to provide a new and improved fitting for explosion-proof electrical systems having a drain port.

It is an even more specific object of the invention to provide a fitting of the class described wherein overfill of the sealing compound is impossible.

It is another object of the invention to provide a fitting of the class described wherein attainment of the proper level of fill of the sealing compound may be easily and readily determined.

It is another object of the invention to provide an explosion-proof electrical fitting which requires neither plugs nor cores to assure proper fill.

It is another object of the invention to provide an explosion-proof fitting which provides a shield over the drain port to prevent the possibility of sealing compound being poured into the fitting and exiting through the drain port without entering the sealing chamber.

It is another object of the invention to provide the above-enumerated advantages and features in a structure having a minimum turning radius.

It is another object of the invention to provide a structure wherein the drain plug may be installed as soon as the sealing compound has been poured.

BRIEF DESCRIPTION OF THE DRAWING

Other advantages, objects and features of the invention will become more apparent as the following description is considered together with the drawing, which illustrates a cross section view of a fitting, made in accordance with the invention, with the sealing compound in place and showing: the drain member, the sealing plug and an optional disposable plug used with the fitting.

Considering now, more specifically, the drawing, there will be seen an electrical fitting indicated generally as 100, which comprises a body member 101 having four ports: an entrance port, 102; and an exit port, 103; a filling port, 104; and a drainage port, 105. Surrounding the entrance port 102 and exit port 103 are hubs 106 and 107, respectively. The entrance port 102 and exit port 103 are suitably threaded to accommodate the coupling of conduit sections 108 and 109. Situated within the body member 101 is a sealing chamber 110 which has an upper limit which is coplanar with the upper limit of inner wall 111 which separates the sealing chamber 110 and the drainage port 105. The approximate lower limit 112 of the sealing chamber 110 is at or below the upper part of the rib 113 of the body member 101. Extending over the upper open end 114 of the drainage port 105 is a shield member 115. The filling port 104 and drainage port 105 are suitably threaded to accommodate sealing plug 116 and drain member 117, respectively.

The fitting 100 couples the conduits 108 and 109 which enclose and protect one or more conductors 118 and provide a means for sealing the atmosphere in conduit 108 from that in conduit 109 to prevent transmission of explosive atmospheres from one conduit to the other and/or to prevent propagation of flame. In order to provide the desired seal between conduits 108 and 109, the fitting 100 is assembled with the conduits, as shown, with the entrance port 102 at the top. The wires 118 would be pulled through the conduits 108 and 109 as required. After the wires 118 are in place, the craftsman preparing the assembly would apply a suitable wadding material 119, such as ceramic fiber, at the upper end of the exit port 103 and the lower limit of the sealing chamber 110 in order to provide a dam so that sealing compound 120 will not be able to pass therethrough. In placing the wadding material 119 to create the necessary dam the craftsman should be careful that the spaces between the wires are properly filled and that the wires are not unnecessarily crowded against each other or the body member 101. Subsequently, the sealing compound 120 is poured into the sealing chamber 110 through the filling port 104. The sealing compound 120 starts as a liquid and fills the sealing chamber 110 and rises to the upper level of the wall 111, whereupon any excess of sealing compound flows over the upper limit of wall 111 and down through the drainage port 105. Accordingly, when the craftsman observes sealing compound emerging from the drainage port 105 he will know that the sealing chamber 110 is filled to the required level. Until such time as sealing compound emerging from the drainage port 105 is seen, the craftsman will know that the level of sealing compound 120 in the sealing chamber 110 is below the required level. In addition, the artisan can observe the level by observation through the filling port 104. The sealing compound should extend from at least the upper part of rib 113 to the lower part of rib 113'. The lower part of rib 113' is coplanar with the top of wall 111. The ribs 113 and 113' serve as stops to prevent any possible movement of the hardened sealing compound 120 in response to a pressure build-up on either side of the sealing compound 120.

It should be observed that there is a shield 115 extending over the upper open end 114 of the drainage port 105, thereby preventing any direct vertical communication between the entrance port 104 and the drainage port 105. That is, the shield 115 prevents pouring any sealing compound 120 into the filling port 104 at such a position or angle that it can flow directly into the drainage port 105. Accordingly, as stated above, at such time as any sealing compound 120 is seen to emerge from the drainage port 105, it constitutes evidence that the sealing chamber 110 has been filled to the required level which is coplanar with the top of wall 111 separating the sealing well 110 and the drainage port 105.

It will be evident that after the sealing compound 120 has hardened, any accumulation of liquid which forms on the upper surface of the sealing compound 120 can flow along the surface thereof and drain through the drainage port 105, thereby preventing an accumulation of liquid within the fitting 100.

After the assembly has been completed and inspected, the plug 116 is screwed into the threads of the filling port 104, and a drain member 117 is screwed into the threads of the drainage port 105. It will be understood that the drain member 117 includes an appropriate configuration including a drainage path so that water, or other liquid, entering the upper opening 114 of the drainage port 105 can pass through the drain member 117 and exit through hole 121 in the drain member 117. However, the drain member 117 is designed to prevent a spark on either side of the drain member 117 from igniting an explosive atomosphere on the other side of the drain member 117. The drain member 117 may be installed immediately after the sealing chamber 110 has been filled without waiting for the compound 120 to harden.

From the above it will be seen that there has been provided a suitable fitting which provides means for draining any accumulated liquid and which prevents the passage of gasses, liquids or vapors from one side of the member 100 to the other side.

It will be appreciated that in assembling these devices it is frequently necessary to be able to turn them in a confined space. Accordingly, the fitting 100 has been designed to provide the necessary and described features without requiring a large turning radius.

Under certain circumstances, it may be desirable to prevent the sealing compound 120 which overflows and passes through the drainage port 105 from coming in contact with the threads of the drainage port. If this need should arise, a simple, disposable plug member 122 having a through passage 123 could be inserted by press-fit into the drainage port 105 and removed subsequent to the pouring of the sealing compound 120.

While there has been shown and described what is considered at present to be a preferred embodiment of the invention, modifications thereto will readily occur to those skilled in the related arts. For example, male threads could be provided on one or more of the ports and/or relative proportions changed to accommodate specific requirements. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiment shown and described, and it is intended to cover in the appended claims all such modifications as fall within the true spirit and scope of the invention.

What is claimed is:

1. A fitting for use in an explosion-proof electrical system comprising in combination:
    (a) a hollow body member having an entrance port, an exit port below and in axial alignment with said entrance port, a filling port and a drainage port;
    (b) said body member including a sealing chamber communicating with all of said ports and situated between said entrance and exit ports;
    (c) said sealing chamber and said drainage port having an upper limit in a coincident horizontal plane and separated by a wall comprising an interior portion of said body member and having an upper limit coincident with said coincident plane; and wherein:
    (d) said body member includes an interior shield member extending over said upper limit of said drainage port for preventing vertical communication between any portion of said filling port and said drainage port.

2. The combination as set forth in claim 1 wherein said filling port provides direct communication with said sealing chamber thereby providing means for placing a suitable packing material in the lower end of said sealing chamber and/or the upper end of said exit port followed by placement of a hardenable sealing compound.

3. The combination as set forth in claim 2 wherein said drainage port serves as an overflow port for any excess sealing compound placed in said sealing chamber.

4. The combination as set forth in claim 3 wherein a disposable protector with a through passage is located in said drainage port for protecting the threads of said drainage port from contact with excess sealing compound.

* * * * *